United States Patent Office 3,522,692
Patented Aug. 4, 1970

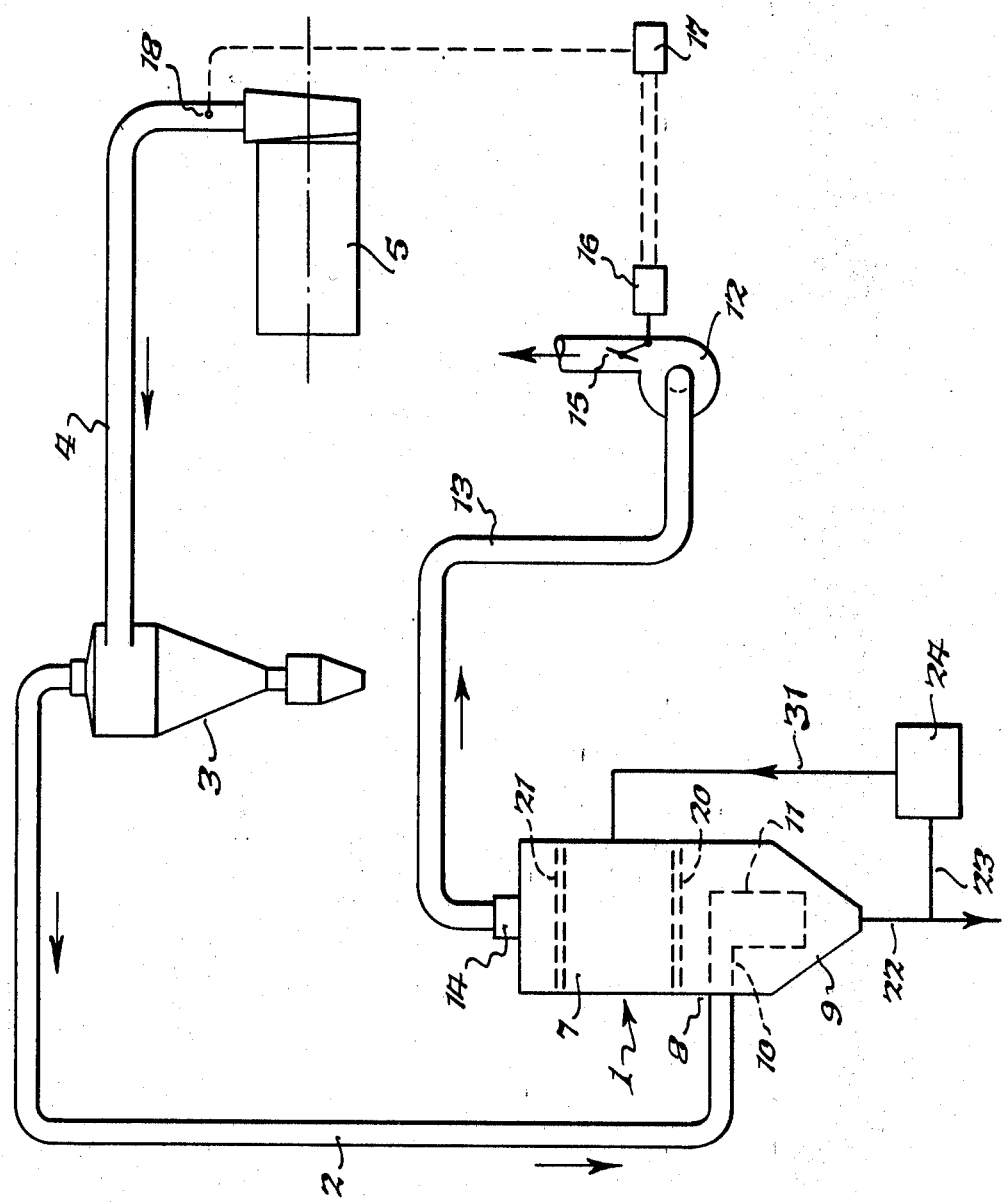

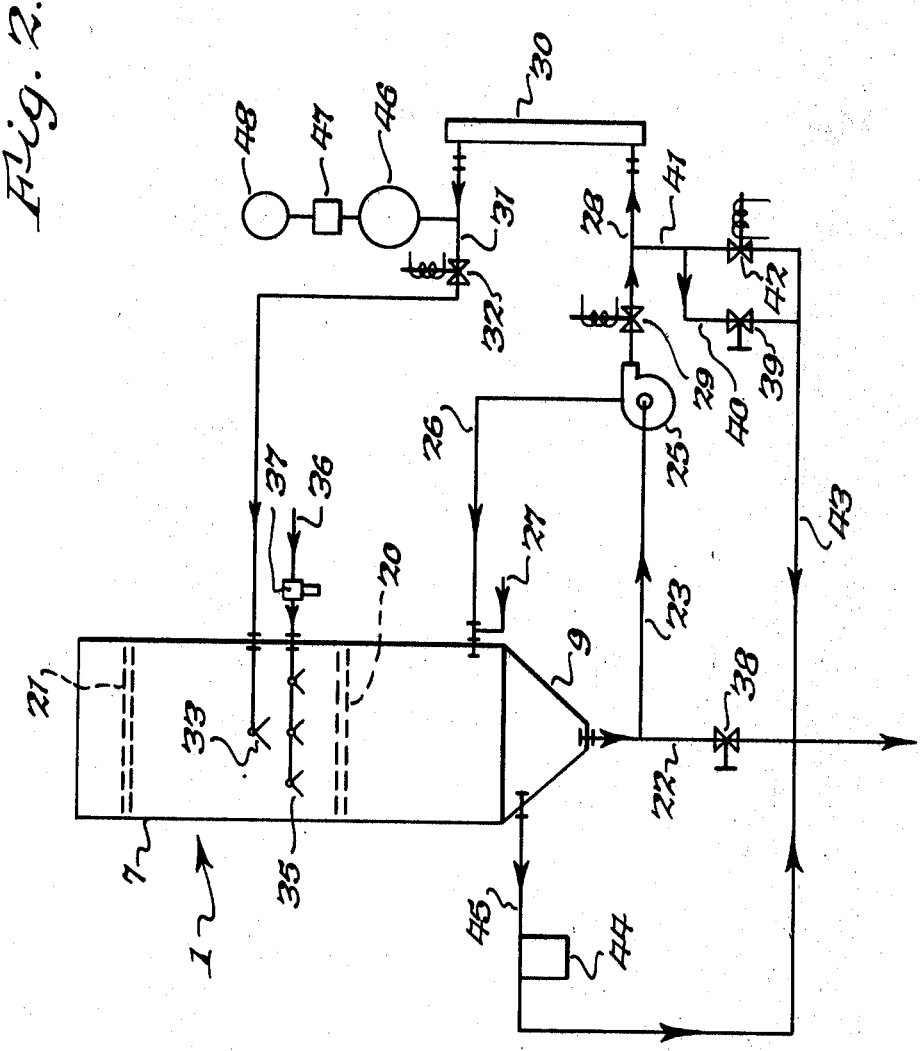

3,522,692
GAS SCRUBBER
Roger S. Brookman, East Aurora, and Gerald H. Beach, Williamsville, N.Y., assignors to Dustex Corp., Buffalo, N.Y., a corporation of New York
Filed Jan. 23, 1968, Ser. No. 699,914
Int. Cl. B01d 47/00
U.S. Cl. 55—233     6 Claims

ABSTRACT OF THE DISCLOSURE

A contaminated gas stream is directed through a scrubber and then through spaced apart primary and secondary filters composed of a reticulated polyurethane foam. The primary filter is wetted, and a fine spray wets the gas stream passing from the primary filter to the secondary filter.

BACKGROUND OF THE INVENTION

This invention relates to the gas scrubbing art, and more specifically to a new and useful wet collector capable of removing condensible odorous vapors as well as particulate contaminants.

The cleaning of vaporous effluents, thereby to avoid contamination of the earth's atmosphere, is a matter of increasing concern. Various efforts have been made and continue to be made to provide efficient scrubbers for the various types of gaseous discharges normally encountered. However, in many situations these efforts have met with limited success, at best, and this is particularly so in the removal of contaminants normally discharged as vapors.

For example, the gaseous effluent from coffee roasting processes poses a severe problem because of the variety and type of contaminants contained therein including, in addition to chaff and other solid particulate material, aldehydes, fats, oils, waxes and organic acids many of which are discharged in the vaporous state and which often produce noxious odors.

So far as we are aware, conventional scrubbers have not worked satisfactorily under such conditions, and it has been necessary to resort to after-burning and other arrangements the cost of which often exceeds the cost of the roasting process itself.

SUMMARY OF THE INVENTION

This invention provides a scrubber utilizing what is believed to be a unique combination of filters and wetting sprays.

A primary object of this invention is to provide a wet scrubber capable of removing both condensible vapors and solid particulates from a contaminated gas stream.

Another object of this invention is to accomplish the foregoing in an arrangement consuming a relatively small quantity of liquid.

Still another object of this invention is to provide the foregoing in highly efficient arrangement, capable of handling large volumes of contaminated gas at elevated temperatures.

The foregoing and other objects, advantages and characterizing features of our invention will become clearly apparent from the ensuing detailed description of an illustrative embodiment thereof, reference being made to the accompanying drawings wherein like reference numerals denote like parts throughout the various views.

DESCRIPTION OF THE DRAWING FIGURES

FIG. 1 is a generally schematic layout of a scrubber installation of this invention; and FIG. 2 is a generally schematic layout of the liquid circuit thereof.

DETAILED DESCRIPTION OF THE ILLUSTRATED EMBODIMENT

Referring now in detail to the accompanying drawings, there is shown a scrubber of our invention, generally designated 1, communicating via conduit 2, chaff cyclone 3 and conduit 4 with a roaster 5. While the instant disclosure is directed to a coffee roaster scrubber installation, it will be appreciated that our invention is not limited thereto. Cyclone 3 and roaster 5 can be of any desired construction and are not part, per se, of our invention whereby a detailed description thereof is unnecessary.

Scrubber 1 includes a housing 7 of any suitable configuration, having an inlet 8 adjacent its lower end, above a liquid reservoir 9. An extension 10 of conduit 2 extends from inlet 8 to a downwardly directed inlet conduit portion 11 of enlarged cross section, turned at 90° to inlet conduit 10 and having its open, lower end submerged in the liquid contained in reservoir 9. An exhaust fan 12 communicates via conduit 13 with the clean air outlet 14 from scrubber 1, being regulated by means including a damper 15 having an actuator 16 connected to a draft controller 17 which has a pressure responsive connection at 18 with the roaster discharge conduit 4. In this way, the action of exhaust fan 12 is responsive to the discharge pressure from roaster 5 in a manner understood by those skilled in the art, it being understood that actuator 16, controller 17 and their connections are conventional.

Our invention is particularly concerned with scrubber 1 which, in addition to the downturn inlet 11 and liquid reservoir 9, includes a primary filter 20 and a secondary filter 21. In the illustrated embodiment, primary filter 20 extends across scrubber 1 above reservoir 9, and secondary filter 21 is above filter 20 in generally parallel relation thereto. However, other orientations of filters 20 and 21 are possible.

A liquid drain connection 22 extends from the bottom of reservoir 9, and has a connection 23 to a circulating pump system generally designated 24 in FIG. 1 and shown in detail in FIG. 2.

Referring now to FIG. 2, pump system 24 is seen to include a circulating pump 25 having an inlet via conduit 23 and a vent into housing 1 immediately above reservoir 9 via conduit 26. A manual fill conduit 27 also can be provided.

The discharge from pump 25 is transmitted via conduit 28 and solenoid controlled valve 29 to a filter 30 of any conventional configuration, preferably of the straight through type, having a releasable coupling to conduits 28 and 31. From filter 30 liquid is passed via conduit 31 and another solenoid control valve 32 to a splash nozzle 33 directed downwardly toward primary filter 20 and discharging the liquid in a coarse, heavy spray so as to thoroughly wet filter 20 completely throughout, notwithstanding the oppositely moving gas stream.

A series of fine spray nozzles 35 receive liquid via conduit 36 and a filter 37. While conduit 36 can be connected to conduit 31 for receiving recirculated liquid it is preferred that nozzles 35 be provided with clean, makeup liquid from any suitable source, not shown. Nozzles 35 produce a fog-like spray, such that they thoroughly wet the gas stream passing from primary filter 20 to secondary filter 21 with a spray or mist which is carried along by the moving gas stream to secondary filter 21.

Drain valves 38 and 39 are provided, the latter being in a by-pass drain conduit 40 leading from a conduit 41 controlled by a solenoid control valve 42 to a return conduit 43 connected to drain 22. An atmospheric level control 44 is connected to reservoir 9 via conduit 45 for maintaining the liquid in reservoir 9 at a predetermined level.

A gas bladder accumulator 46 is connected to conduit 31, and has connected thereto a pressure switch 47 and timer 48. Upon a predetermined pressure drop across filter 30, switch 47 causes normally open valves 29 and 32 to close, and normally closed valve 42 to open, for cleaning filter 30. After a filter cleaning cycle of predetermined time, timer 48 restores valves 29, 32 and 42 to their normal position, for normal operation.

The down turned inlet section 11 provides an impingement section, causing heavier particles to separate and drop into the reservoir 9 from which they are drained and subsequently removed. The gas stream agitates the liquid in reservoir 9, in which the inlet 11 is immersed, producing a high degree of turbulence for agglomerating and scrubbing of the gas stream as it exits around the edge of inlet 11. The liquid in reservoir 9 also cools the gas stream, to begin condensing of the vaporous contaminants therein.

It will be appreciated that other forms of scrubber of the wet collector type can be used in place of inlet section 11 and reservoir 9.

It is a particular feature of our invention that primary filter 20 and secondary filter 21 comprise, in each case, reticulated polyurethane foam material. Such foams are commercially available from Scott Paper Company, Philadelphia, Pa., under the trademark "Scottfoam" and are fully disclosed and described, together with processes for their production in U.S. Pat. 3,171,820 issued to said Scott Paper Company under date of Mar. 2, 1965 on an application filed in the name of Robert A. Volz. Since these foams are commercially available, and per se no part of our invention, a detailed disclosure thereof herein appears to be unnecessary. Suffice it to say that we use reticulated polyurethane foams such as are disclosed in said patent, each filter 20, 21 comprising a slab thereof.

The reticulated products of the present invention can be characterized as a polyurethane resin structure in which the strands forming the 3-dimensional network intersect in an integrally formed non-planar nexus, and define, in skeletal form, the outline of multi-sided polyhedral cells. The average diameter of the polygonal cell faces outlined by the strands may vary, as determined by the pore size or cell face diameter of the cellular structures from which the skeletal structures are obtained, from about 0.05 mm. to about 20 mm.

It is important that the foam not be glazed and smooth, but that the strands have tendrils and various strand nexuses have ravel ends making the cellular network somewhat hairy in appearance. This aids significantly in the collecting action of filters 20 and 21.

Further in accordance with our invention, primary filter 20 is a foam of relatively large cell size, while secondary filter 21 is a foam of relatively small cell size. The larger cell size of primary filter 20 lengthens the service time of the filter by decreasing the rate at which the face of the filter plugs with contaminants.

Primary filter 20 is maintained continually-wetted, throughout, by splash nozzle 33, and promotes liquid-gas contact. As a result, the temperature of the gas stream is lowered, condensing some of the contaminating vapor, some of which collects on the filter. Also, certain of the contaminating gases, such as the aldehydes, are absorbed in the liquid and thereby removed.

As the partially cooled gas stream passes from primary filter 20 to secondary filter 21 it is wetted again by the fine spray from nozzles 35. These produce a fog-like atmosphere, to provide maximum total contact area between the liquid discharged from nozzles 35 and the gas stream. This results in added cooling and condensing, together with agglomeration between the fine liquid droplets and the condensed contaminants including those which passed through the primary filter 20.

Secondary filter 21 is moistened by the fog or mist, which is carried by the gas stream into the secondary filter, and therefore promotes liquid-gas contact for additional removal of contaminants through collection and absorption. Also, filter 21 eliminates the moisture from the gas stream, whereby the gas discharging from secondary filter 21 is dry.

The scrubber of this invention has proven highly effective in handling condensible odorous vapors, such that no odor is detectable in the gas stream exiting from the scrubber. The liquid reservoir, together with the thoroughly wetted filter 20 and the fog spray 35 reduce the temperature of the gas stream to a level causing these contaminants to condense and collect on the filters, through both impingement and contact. The relatively large cell filter 20 is cleaned, to some degree, by the water from nozzle 33, and the arrangement is such that a significantly long filter life is provided both filters. The scrubber can handle substantial variations in both volume and temperature of the gas, as during the quench part of a roasting cycle, and is capable of effectively trapping and removing the myriad contaminants of the gas stream even where the latter initially is at an elevated temperature. Obviously, the scrubber of our invention is useful in a wide variety of situations.

Accordingly, it is seen that our invention fully accomplishes its intended objects. While a single embodiment has been disclosed, that has been done by way of illustration without thought of limitation, it being understood that variations and modifications will readily occur to those skilled in the art and are intended to be included in the appended claims.

What is claimed is:

1. Apparatus for separating contaminants from a gas stream comprising a housing having a contaminated gas inlet and a clean gas outlet, a primary filter in and across said housing downstream of said inlet, a secondary filter in and across said housing downstream of said primary filter, means for moving a gas stream from said inlet through said primary and secondary filters to said outlet, each of said filters comprising a reticulated polyurethane foam, first liquid discharge means directed toward said primary filter and operable to maintain the same continually wetted substantially throughout, and second liquid discharge means comprising fine spray means between said filters producing a fog-like mist carried along by the moving gas stream and wetting the gas stream passing from said primary filter to said secondary filter, said secondary filter also comprising a moisture eliminator, said filters being superposed above said inlet, said first liquid discharge means comprising coarse spray means also positioned between said filters and discharging liquid in a heavy spray onto said primary filter against the moving gas stream.

2. Apparatus as set forth in claim 1, wherein said primary filter comprises a foam of relatively large cell size, and said secondary filter comprises a foam of relatively small cell size.

3. Apparatus as set forth in claim 1, together with gas scrubber means between said inlet and said primary filter providing additional gas-liquid contact and particle removal.

4. Apparatus as set forth in claim 3, said gas scrubber means comprising a liquid reservoir, said filters being superposed above said reservoir, and said inlet including a downwardly directed conduit portion having an open lower end submerged in the liquid contained in said reservoir.

5. Apparatus as set forth in claim 1, wherein said fine spray means are positioned between said primary filter and said coarse spray means.

6. Apparatus as set forth in claim 1, said foam comprising strands having tendrils and strand nexuses having ravel ends.

References Cited

UNITED STATES PATENTS

| | | | |
|---|---|---|---|
| 1,493,110 | 5/1924 | Diehl | 55—96 |
| 2,008,800 | 7/1935 | Somers | 55—333 |
| 1,493,579 | 5/1924 | Walter | 55—228 |
| 2,146,071 | 2/1939 | Horvath | 55—333 |
| 2,523,441 | 9/1950 | McKamy | 55—223 |
| 2,649,924 | 8/1953 | McIlvaine et al. | 55—233 |
| 2,668,754 | 2/1954 | Lichtenfels | 55—85 |
| 2,927,659 | 3/1960 | Pabst et al. | 55—227 |
| 3,144,315 | 8/1964 | Hunn | 55—522 |
| 3,171,820 | 3/1965 | Volz | 261—94 |
| 3,220,707 | 11/1965 | Weatherston et al. | 261—96 |
| 3,250,059 | 5/1966 | Vosseller | 55—90 |
| 3,260,036 | 7/1966 | De Bellis | 55—223 |
| 3,266,227 | 8/1966 | Plizak et al. | 55—485 |
| 3,293,174 | 12/1966 | Robjohns | 261—94 |
| 3,336,733 | 8/1967 | Wisting | 55—228 |
| 3,349,546 | 10/1967 | Rogers | 55—228 |
| 2,453,447 | 11/1948 | McKeown | 55—233 |
| 2,676,670 | 4/1954 | Gaggnaire | 261—98 |
| 3,409,409 | 11/1968 | Sackett | 55—233 |

FRANK W. LUTTER, Primary Examiner

B. NOZICK, Assistant Examiner

U.S. Cl. X.R.

55—255, 342, 259, 283, 482, 522, 467; 261—122, 98, 3, 36